United States Patent
Zhang et al.

(10) Patent No.: US 7,139,854 B2
(45) Date of Patent: Nov. 21, 2006

(54) PIPELINING ACCESS TO SERIALIZATION TOKENS ON A BUS

(75) Inventors: Jonathan Y. Zhang, Plano, TX (US); Robert J. P. Nychka, Richardson, TX (US); Eric L. P. Badi, Cagnes sur Mer (FR)

(73) Assignee: Texas Instruments Incorporated, Dallas, TX (US)

( * ) Notice: Subject to any disclaimer, the term of this patent is extended or adjusted under 35 U.S.C. 154(b) by 204 days.

(21) Appl. No.: 10/458,572

(22) Filed: Jun. 10, 2003

(65) Prior Publication Data

US 2004/0255066 A1   Dec. 16, 2004

(51) Int. Cl.
*G06F 13/00* (2006.01)
(52) U.S. Cl. ............. 710/110; 710/107; 710/108
(58) Field of Classification Search ............ 710/107, 710/108, 110, 117, 124; 370/449–452, 458
See application file for complete search history.

(56) References Cited

U.S. PATENT DOCUMENTS

| | | | |
|---|---|---|---|
| 4,667,323 A * | 5/1987 | Engdahl et al. | 370/451 |
| 5,388,223 A * | 2/1995 | Guthrie et al. | 370/448 |
| 5,533,204 A * | 7/1996 | Tipley | 710/108 |
| 5,784,648 A | 7/1998 | Duckwall | |
| 5,903,728 A | 5/1999 | Semenzato | |
| 5,948,089 A | 9/1999 | Wingard et al. | |
| 6,456,628 B1 * | 9/2002 | Greim et al. | 370/466 |

OTHER PUBLICATIONS

"PCI Local Bus Specification", Jun. 1, 1995, pp. I-XVI-1-282, XP002251932.

* cited by examiner

*Primary Examiner*—Khanh Dang
(74) *Attorney, Agent, or Firm*—Carlton H. Hoel; W. James Brady; Frederick J. Telecky, Jr.

(57) ABSTRACT

Apparatus and methods are disclosed herein that provide reduced bus transaction latency on a bus architecture that includes at least one master coupled to a plurality of slaves. As disclosed herein, a device (e.g., a slave) may include bus logic and host logic coupled to the bus logic. The bus logic may obtain a serialization token permitting the host logic to complete a transaction received by the bus logic via the bus. Further, the bus logic may keep the serialization token to complete at least one other transaction.

23 Claims, 3 Drawing Sheets

US 7,139,854 B2

PIPELINING ACCESS TO SERIALIZATION TOKENS ON A BUS

BACKGROUND

1. Field of the Invention

The present invention generally relates to bus architectures. More particularly, the present invention relates to the use of serialization tokens by devices coupled to a bus.

2. Background Information

Many types of electrical systems include at least one "bus" over which electrical components may communicate with one another in a coordinated manner. By way of example, such components may include processors, memory modules, etc. Some integrated circuits, such as processors, may internally include a processor core and one or more memory devices coupled together via a bus.

Some types of busses permit a bus "master" to be coupled to one or more slaves. In such architectures, the master may be responsible for initiating transactions on the bus that target the slaves. The transactions initiated by the master may include "write" transactions in which data is provided to a slave, "read" transactions in which data is provided by a slave to the master, and other types of transactions. In some architectures, transactions processed by the slaves preferably are processed in the same order that the transactions are issued by the master. Accordingly, a mechanism for accomplishing the correct ordering is needed in such architectures. It is also generally desirable to minimize the amount of latency on the bus, thereby increasing the effective bandwidth of the bus.

BRIEF SUMMARY

In accordance with various embodiments described herein, apparatus and methods are disclosed that provide reduced bus transaction latency on a bus architecture that includes at least one master coupled to a plurality of slaves. As disclosed herein, a device (e.g., a slave) may include bus logic and host logic coupled to the bus logic. The bus logic may obtain a serialization token permitting the host logic to complete a transaction received by the bus logic via the bus. Further, the bus logic may keep the serialization token to complete at least one other transaction.

The device may be part of a system that includes a bus, a master coupled to the bus and a plurality of slaves also coupled to the bus. The master may issue transactions on the bus in a particular order. Each of the slaves may receive some or all of the transactions and may collectively complete the transactions in the order they are issued by the master. Each slave may obtain a serialization token permitting the slave to complete a current transaction. The slave may keep the serialization token to complete at least one additional transaction.

A method is also disclosed herein. The method may be implemented in a slave device that is usable in an electronic system. The system may comprise a master and a plurality of slaves coupled to the master via a bus. The method may include detecting that the master has issued a transaction to the slave, obtaining a token, completing a transaction, and keeping the token upon completion of the transaction if the master has issued another transaction to the slave.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, different companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect connection. Thus, if a first device couples to a second device, that connection may be through a direct connection, or through an indirect connection via other devices and connections. To the extent that any term is not specially defined in this specification, the intent is that the term is to be given its plain and ordinary meaning.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
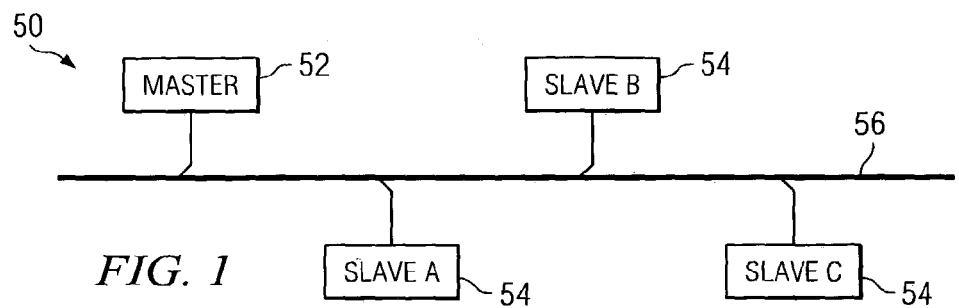
FIG. 1 illustrates a bus architecture include a master and a plurality of slaves in accordance with a preferred embodiment of the invention.

Referring now to FIG. 1, an electronic system 50 is shown in accordance a preferred embodiment of the invention. As shown, the system 50 may include a master device 52 (referred to herein as a "master") and three slave devices 54 (referred to herein as "slaves") coupled together via a bus 56. The slaves 54 shown in FIG. 1 are designated as slave A, slave B, and slave C for ease in explaining the preferred embodiments of the invention. In accordance with some embodiments, the system 50 may include only a single master 52 and one or more slaves 54. In other embodiments, the system may include more than one master 52. In general, the master 52 may initiate transactions on the bus 56 that target one or more of the slaves 54. The master 52 may initiate transactions so that more than one transaction may be outstanding at a time on the bus 56. For example, the master 52 may initiate a write transaction to slave A, followed by a read transaction to slave B. At that point in time, both transactions are pending and/or being executed by the slaves A and B. In accordance with the preferred embodiment, the master 52 may have two transactions outstanding at a time. That is, when two transactions currently are outstanding (i.e., the slave has not yet signaled the master that the slave is ready to complete the transaction), the master may not initiate another transaction until one of the currently outstanding transactions completes. Further, in accordance with the preferred embodiments, the transactions are processed by the slaves 54 and completed in the order the transactions are initiated by the master 52. The system 50 may be representative of a processor, such as a digital signal processor ("DSP"), a computer system, or any type of device or system that may be characterized by the preceding description. In accordance with some embodiments, the master 52 may comprise a DSP processor core and the slaves may comprise memory components. At least one of the slave memory components may comprise an instruction cache (I cache).

The bus 56 preferably comprises a plurality of signals over which data and addresses may be transferred between devices 52, 54. A variety of implementations of bus 56 are possible. Table I below illustrates at least some of the signals that may be implemented in accordance with an embodiment of bus 56.

TABLE I

Bus Signal Descriptions

| Signal Name | I/O | Polarity | Brief Description |
|---|---|---|---|
| gl_preq_nr | I | Active low | Fetch request from master to a particular slave to retrieve data. |
| pready_nr | O | Active low | Acknowledge fetch access; the data will be sent back to master in the following cycle. |
| gl_pabus_tr(23:2) | I | Active high | Address for bus. |
| pdbus_tr(31:0) | O | Active high | Data for bus. |
| pstall_tr | O | Active high | Stall signal for bus generated by slave for serializing data return of different slaves. |
| gl_syspstall_tr | I | Active high | OR of pstall_tr signals of all slaves. If gl_syspstall_tr=1 and slave's pstall_tr=0, another modules has the precedence in returning its pready_nr signal. |
| buserr_nr | O | Active low | Signals a buserror condition. |
| gl_pdismiss_tr | I | Active high | Signals that any pending fetches are to be abandoned, this signals a reset of the bus activities. |
| master_preq_tr | I | Active high | OR of all gl_preq_nr signals. Indicates that master has sent a request to a slave. |

The master 52 may initiate a transaction to a slave 54 on bus 56 by asserting the gl_preq_tr signal to the target slave. The master_preq_tr signal also may be asserted when the master issues a request. The master_preq_tr signal becomes asserted when the master issues a request to any slave, while separate gl_preq_tr signals may be provided to each slave. Accordingly, by monitoring the master_preq_tr and gl_preq_tr signals, each slave 54 may detect the initiation of a transaction including transactions targeting itself or other slaves. The assertion of both the master_preq_tr and gl_preq_tr signals indicates that a transaction is targeting that slave, while the assertion of only the master_preq_tr signal, and not the gl_preq_tr signal, indicates that a transaction has been issued to another slave. As described below, each slave may have logic that monitors these and other bus signals to make such determinations. In an alternative embodiment, the slave may detect the assertion of master_preq_tr signal and decode the address provided on the gl_pabus_tr(23:2) signals to determine whether or not a transaction targets that particular slave (each slave preferably is assigned a unique address). In this latter embodiment, the each slave 54 may not be provided with a separate gl_preq_tr signal. Instead, address decoding in the slave is used to determine the target destination of a transaction.

The gl_pdsmiss_tr signal may be asserted by the master 52 to cause any pending fetches to be abandoned and a reset of the bus activities to occur. The buserr_nr signal may be asserted by any of the slaves 54 to indicate the detection of a bus error condition. A slave 54 may assert its pready_nr signal to acknowledge a fetch access. This signal also indicates that the requested data to be returned will be sent to the master 52 in the subsequent clock cycle. Data and addresses may be transferred using the pdbus_tr(31:0) and the gl_pabus_tr(23:2) signals. The gl_preq_nr signal indicates that the master 52 has initiated a fetch request.

The devices 52, 54 on the bus 56 may implement a "token." A slave 54 "obtains" a token to complete a transaction initiated by the master 52. The use of the token helps to ensure the serialization of the transactions, that is, that the transactions are completed in the order they are issued by the master 52. In accordance with the preferred operation of the bus 56, a slave 54 may not complete a transaction while the token is being held by another slave. Any suitable technique may be used to implement a token. For example, the pstall_tr signal may be asserted by a slave 54 when the slave determines that it is acceptable for it to obtain the token to complete a transaction.

Figure 2:
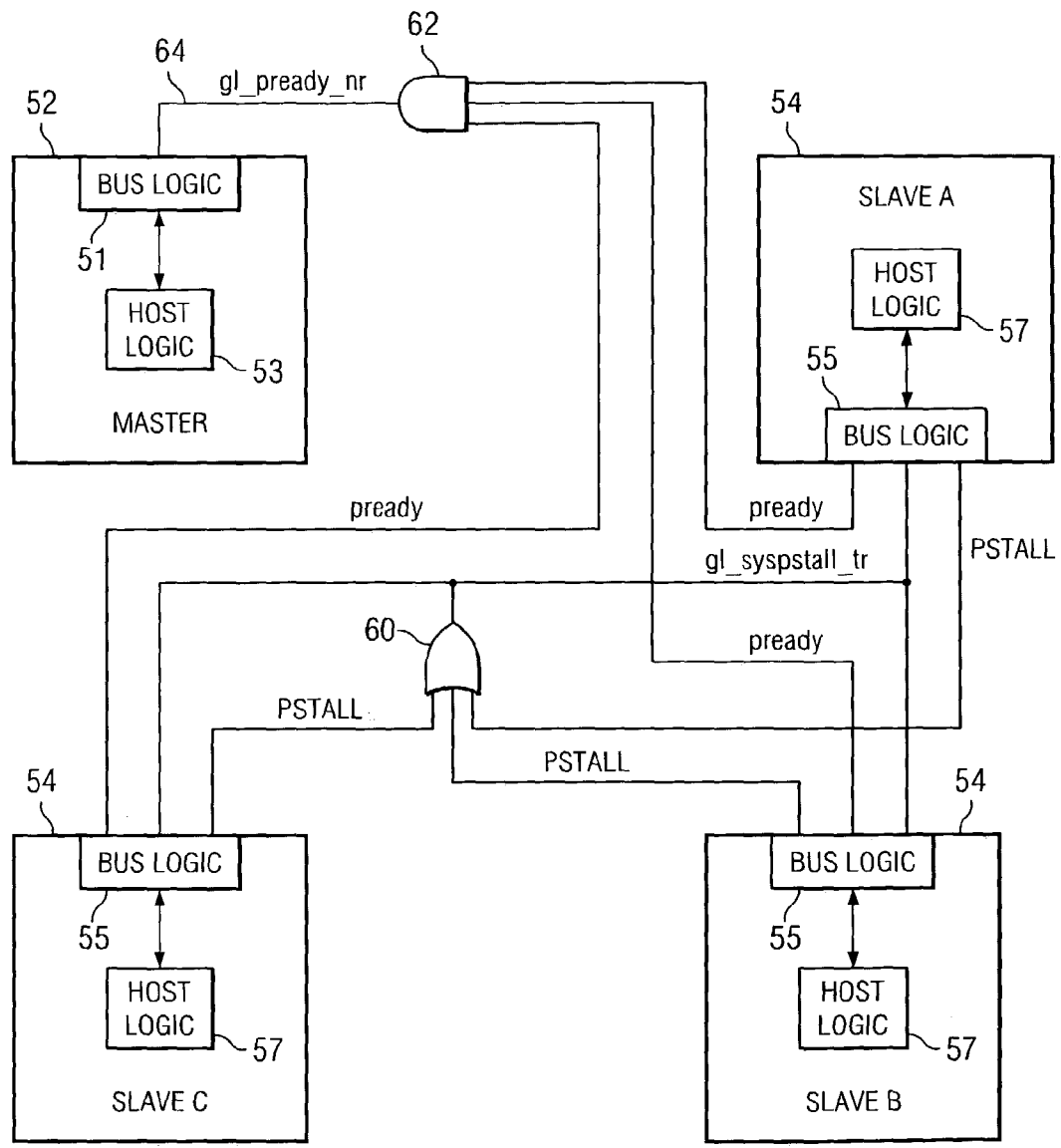
FIG. 2 shows the various signals included in the bus depicted in FIG. 1.

Referring briefly to FIG. 2, some of the signals listed above may be combined together to form other signals. As shown in FIG. 2, for example, the pstall_tr signals from the various slaves 54 may be logically combined together by, for example, OR gate 60. The resulting gl_syspstall_tr signal preferably thus becomes asserted when any of the slaves 54 asserts its pstall_tr signal. The gl_syspstall_tr signal preferably is provided back to all of the slaves 54 so that every slave may detect when any one of the slaves asserts its pstall_tr signal. Additionally, the pready_nr signals from each of the slaves 54 may be logically combined together by, for example, AND gate 62, to produce a global pready signal (gl_pready_nr) 64 that is provided to the master 52. This gl_pready_nr signal 64 may indicate to the master 52 that one of the slaves 54 is ready to return data in the subsequent clock cycle.

In accordance with the preferred embodiments of the invention, a slave 54 may obtain the token (however the token is implemented) to permit a transaction to be completed and hold on to the token while the slave 54 completes at least one other transaction. By not returning the token following the completion of each transaction merely to have to obtain the token all over again, a process which consumes at least one clock cycle, latency may be reduced. This may be especially true when the master 52 initiates a plurality of transactions to the same slave.

Figure 3:
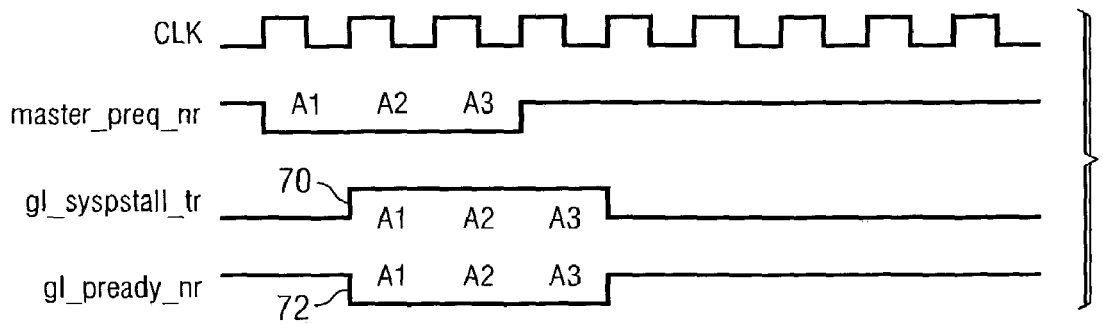
FIG. 3 includes a timing diagram illustrating the preferred operation of the bus of FIG. 1.

This process is exemplified in the timing diagram of FIG. 3 which includes a clock signal, master_preq_tr signal, gl_sysptall_tr signal, and the gl_pready_nr signal. As shown, the master 52 initiates a sequence of three transaction to slave A. The three transactions are designated as A1, A2, and A3. The master 52 may assert its master_preq_tr signal for three consecutive clock cycles to initiate the three transactions A1–A3. In the example of FIG. 3, at reference numeral 70, slave A asserts its pstall_tr signal for three consecutive clock cycles (depicted as the assertion of the gl_Syspstall_tr signal) to thereby obtain the token for three consecutive clock cycles. The slave A also asserts its pready_nr signal at 72 for three consecutive clock cycles to complete all three transactions A1–A3 (depicted as the assertion of the gl_pready_nr signal).

Figure 4:
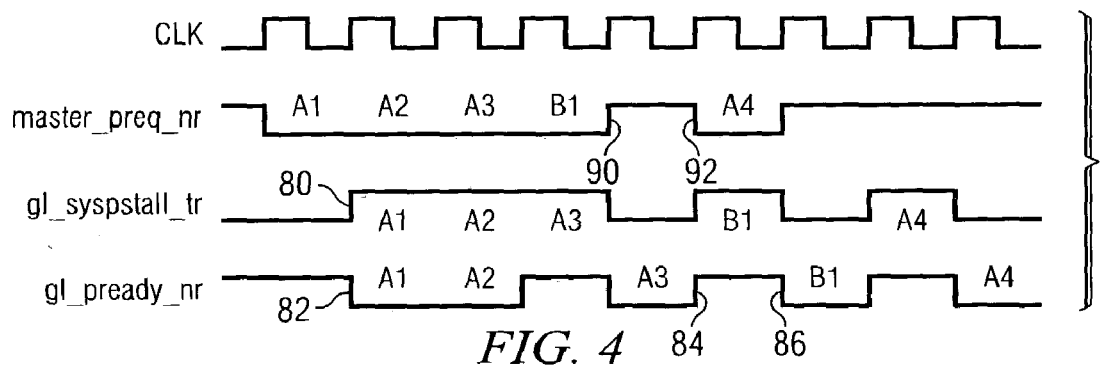
FIG. 4 includes a timing diagram illustrating a preferred operation of the bus of FIG. 1 in which a wait state may be included before completing a transaction.

In accordance with the preferred embodiments of the invention, a slave 54 may delay asserting its pready_nr signal, thereby delaying the completion of the transaction. As explained below with reference to FIG. 4, the delay may be imposed by the slave 54 to ensure that transactions issued by the master 52 are completed in the order issued. Reference will now be made to FIG. 4 to illustrate the purpose of the delay. In accordance with the exemplary timing diagram of FIG. 4, the master 52 initiates five transactions—four transactions designated as A1–A4 to slave A and one transaction designated as B1 to slave B. The order of the transactions is shown in accordance with the master's master_preq_nr signal as A1, A2, A3, B1 and A4. Because the first three transactions are destined for slave A, slave A obtains the token by asserting its pstall_tr signal which is reflected in FIG. 4 at 80 as the gl_syspstall_tr signal. The gl_syspstall_tr signal may be asserted for three consecutive clock cycles corresponding to the three transactions A1–A3 to slave A. Slave A may assert its pready_nr signal at 82 for two consecutive clock cycles as shown. The pready_nr signal may be released at 84 and reasserted one clock cycle later (the delay referenced above) at 86. The length of the delay may be varied as desired. As explained below, the purpose of the delay is to cause the master 52 to delay the issuance of the next transaction after B1 (i.e., the A4 transaction).

The following describes what would happen without the delay. Referring still to FIG. 4, without the delay, slave A would continue to assert its pready_nr signal at 84, rather than delaying assertion of its pready_nr as shown. At the clock cycle beginning at 84, slave A will have indicated that it is prepared to return data in the next cycle (which begins at 86) and, at that point in time, the master will have already initiated transaction B1. As noted previously, in accordance with the preferred embodiment, only two transactions may be outstanding at any point in time on the bus 56. The assertion of a slave's pready_nr signal may signal to the master 52 that another transaction may be initiated because only transaction (B1) is considered outstanding at that time. Thus, if slave A does not delay the assertion of its pready_nr signal as shown in FIG. 4, the master 52 will detect that slave A has already asserted its pready_nr signal and that only transaction B1 is outstanding. The master 52 then may initiate transaction A4 at clock edge 90, one cycle earlier than that shown. Once the master initiates the A4 transaction, both transactions (B1 and A4) will be outstanding at that time. Consequently, despite transaction B1 being issued before A4, either slave A or slave B may complete its outstanding transaction. If slave A obtains the token before slave B, transaction A4 will be undesirably processed before transaction B1. By delaying the assertion of its pready_nr signal until 86, slave A can cause the master 52 to delay issuing transaction A4, thereby alleviating the problem described above. With the delay of slave A's pready_nr signal, master 52 will not issue A4 at 90 because, at 90 the master 52 will determine that both transactions A3 and B1 are still outstanding, thereby precluding the master from issuing a third transaction at that time. Instead, the master 52 will wait until edge 92 before issuing the next transaction (A4).

In accordance with various embodiments of the invention, a slave 54 may obtain a serialization token by, for example, asserting its pstall_tr signal, when the following three conditions designated as (1), (2) and (3) are all true. Conditions 2 and 3 are met when either the (a) condition or the (b) condition is true as indicated below. The three conditions are:

The slave 54 detected that the master 52 has issued a transaction to that slave in the current cycle (n) or an earlier cycle. This condition can be determined by the slave monitoring the master's master_preq_tr signal; and (2) At least one of the following is true:
  (a) No other slaves obtained the token (e.g., by asserting their pstall signals) in the current cycle n;
  (b) There is a pdismiss in the current cycle n and also a prequest is received in the current cycle; and (3) At least one of the following is true:
  (a) The slave is not going to return pready in the next cycle, n+1;
  (b) No other slaves 54 have received a prequest in cycle n+1 and there is no outstanding prequest in other slaves in the current cycle n (i.e., no other slave will need the token in cycle n+2).

Condition (2a), in which a slave 54 determines whether another slave has obtained the token, may be determined in accordance with a variety of techniques. For example, a slave 54 may include bus logic 55 as shown in FIG. 3. Bus logic 55 may provide an interface to the bus 56 and may include decode logic that interprets the signals on the bus, decodes the addresses and informs the slave's host logic 57 regarding the same. The host logic 57 may be coupled to the bus logic 55. The host logic 57 may include control logic, memory and other components for performing one or more desired function(s). The master 52 may also include bus logic 51 coupled to host logic 53 to permit the master 52 to perform one or more desired functions(s).

Figure 5:
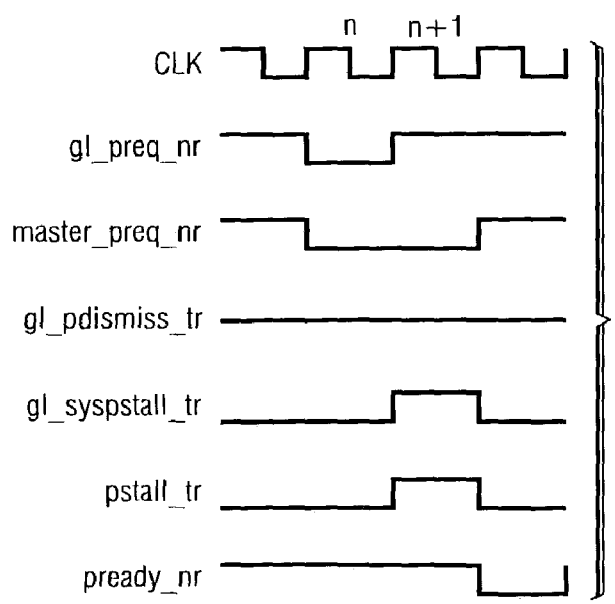
FIG. 5 includes a timing diagram depicting an exemplary operation of the bus of FIG. 1 in accordance with a set of conditions.
Figure 6:
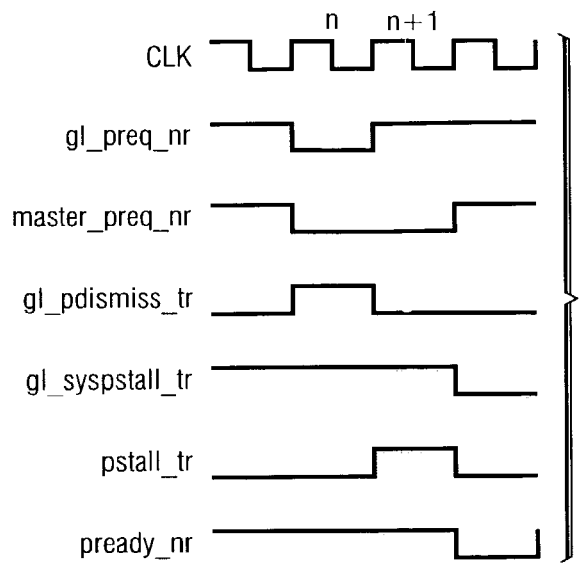
FIG. 6 includes a timing diagram depicting an exemplary operation of the bus of FIG. 1 in accordance with another set of conditions.
Figure 7:
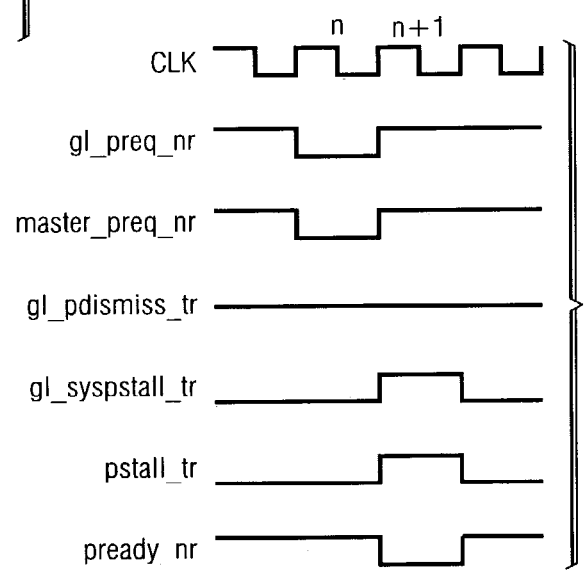
FIG. 7 includes a timing diagram depicting an exemplary operation of the bus of FIG. 1 in accordance with another set of conditions.
Figure 8:
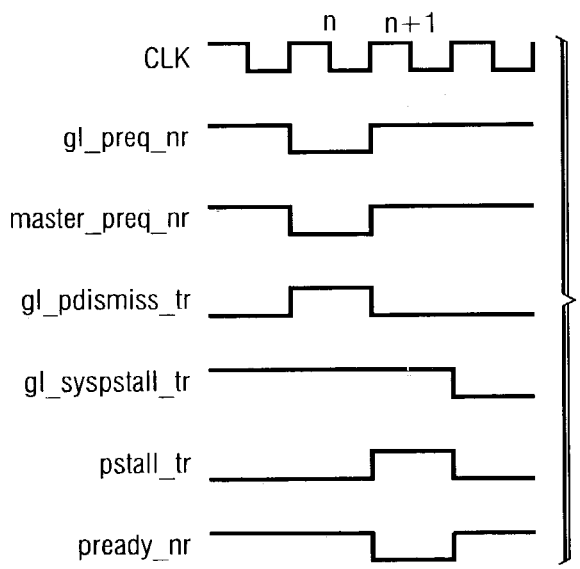
FIG. 8 includes a timing diagram depicting an exemplary operation of the bus of FIG. 1 in accordance with another set of conditions.

FIGS. 5–7 show timing diagrams illustrating these various conditions. FIG. 5, for example, shows the occurrence of conditions (1), (2a) and (3a) explained above. FIG. 6 shows the occurrence of conditions (1), (2b) and (3a). FIG. 7 shows the occurrence of (1), (2a) and (3b), while FIG. 8 shows the occurrence of conditions (1), (2b) and (3b). In the four examples of FIGS. 5–7, the slave detects an asserted master_preq_nr signal in cycle n and asserts its pstall_tr signal in the next cycle (n+1) to obtain the token when the relevant conditions are true as shown and as described above. In the examples of FIGS. 7 and 8, the slave is able to assert its pready_nr signal concurrent with pstall_tr (i.e., 0-wait state) to complete the transaction. In FIGS. 5 and 6, the slave delays the assertion of its pready_nr signal by a single clock cycle (i.e., 1-wait state) to ensure the correct order of transaction processing by slaves as explained above.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method implemented in slave device usable in an electronic system comprising a master and a plurality of slaves coupled to the master via a bus, comprising:
   detecting that the master has issued a transaction to the slave;
   obtaining a token;
   completing a transaction; and
   the slave keeping the token upon completion of the transaction if the master has issued another transaction to the slave.

2. The method of claim 1 wherein obtaining the token comprises asserting a signal indicating that the slave is processing its transaction.

3. The method of claim 1 further including obtaining the token when the master has issued a transaction to that slave, no other slave has obtained the token, and the slave is not going to complete the transaction in a next clock cycle.

4. The method of claim 1 further including obtaining the token when the master has issued a transaction to that slave, a dismiss signal is asserted indicating that the current transactions are to be aborted, and the slave is not going to complete the transaction in a next clock cycle.

5. The method of claim 1 further including obtaining the token when the master has issued a transaction to that slave, no other slave has obtained the token, and no other slaves have received a transaction.

6. The method of claim 1 further including obtaining the token when the master has issued a transaction to that slave, a dismiss signal is asserted indicating that the current transactions are to be aborted, and no other slaves have received a transaction.

7. An electronic device adapted to communicate via a bus with other devices, comprising:
   bus logic; and
   host logic coupled to said bus logic;
   wherein said bus logic obtains a serialization token permitting host logic to complete a transaction received by said bus logic via said bus and said bus logic keeps said serialization token to complete at least one other transaction.

8. The electronic device of claim 7 wherein said bus logic obtains said serialization token by asserting a first signal.

9. The electronic device of claim 8 wherein said bus logic asserts a ready signal to inform another device on the bus that the electronic is prepared to complete a transaction and said bus logic delays the assertion of the ready signal to ensure transactions are completed in the order the transactions are issued on the bus.

10. The electronic device of claim 7 wherein said bus logic asserts a ready signal to inform another device on the bus that the electronic is prepared to complete a transaction and said bus logic delays the assertion of the ready signal to ensure transactions are completed in the order the transactions are issued on the bus.

11. The electronic device of claim 7 wherein said bus logic asserts a ready signal to inform another device on the bus that the electronic is prepared to complete a transaction and said bus logic delays the assertion of the ready signal to cause a master device coupled to the bus to delay issuance of a transaction.

12. A system, comprising:
   a bus;
   a master coupled to said bus, said master issues transactions on said bus in a particular order;
   a plurality of slaves coupled to said bus, said slaves receive said transactions and complete said transactions in said order;
   each of said slaves obtains a serialization token permitting said slave to complete a current transaction and said slave keeps the serialization token to complete at least one additional transaction.

13. The system of claim 12 wherein each slave obtains said serialization token by asserting a first signal on said bus.

14. The system of claim 13 wherein said slave asserts a ready signal to inform said master that the slave is prepared to complete a transaction and said slave delays the assertion of the ready signal to ensure transactions are completed in the order the transactions are issued by the master.

15. The system of claim 13 further including logic that receives each of said first signals from said slaves and logically combines said first signals to produce a global signal that is provided to each of said slaves, said global signal indicating whether one of said slaves has asserted its first signal.

16. The system of claim 12 wherein said bus logic asserts a ready signal to inform said master that the slave is prepared to complete a transaction and said slave delays the assertion of its ready signal to ensure transactions are completed in the order the transactions are issued by the master.

17. The system of claim 12 wherein said slave asserts a ready signal to inform the master that the slave is prepared to complete a transaction, and said slave delays the assertion of its ready signal to cause the master to delay issuance of a transaction.

18. The system of claim 12 wherein said system is included in an integrated circuit.

19. The system of claim 12 wherein said system comprises a digital signal processor.

20. A system, comprising:
   a bus;
   a master coupled to said bus, said master issues transactions on said bus in a particular order;
   a plurality of slaves coupled to said bus, said slaves receive said transactions and complete said transactions in said order;
   each of said slaves includes a means for obtaining a serialization token thereby permitting said slave to complete a current transaction and a means for the slave to keep the serialization token to permit the slave to complete at least one additional transaction.

21. The system of claim 20 wherein said means for obtaining a serialization token includes a means for asserting a first signal on said bus.

22. The system of claim 20 wherein said slave includes a means for asserting a ready signal to inform said master that the slave is prepared to complete a transaction and for delaying the assertion of its ready signal to ensure transactions are completed in the order the transactions are issued by the master.

23. The system of claim 20 wherein said slave includes a means for asserting a ready signal to inform said master that the slave is prepared to complete a transaction and for delaying the assertion of its ready signal to cause the master to delay issuance of a transaction.

* * * * *